United States Patent [19]
Fehmerling

[11] 3,843,810
[45] Oct. 22, 1974

[54] PROCESS OF AIR EVACUATION OF FOODS UNDER ULTRA-LOW PRESSURE

[75] Inventor: Gottlieb Bernhard Fehmerling, Bridgeton, N.J.

[73] Assignee: Fehmerling Associates, Bridgeton, N.J.

[22] Filed: May 16, 1972

[21] Appl. No.: 253,723

Related U.S. Application Data

[63] Continuation-in-part of Ser. No. 60,765, Aug. 3, 1970, abandoned.

[52] U.S. Cl................ 426/204, 426/486, 426/207, 426/376, 426/377, 426/506, 426/323
[51] Int. Cl........ A22c 29/00, A23b 7/00, A23l 1/28
[58] Field of Search ............ 99/103, 111, 154, 158, 99/190; 426/204, 205, 206, 207, 208, 209, 210, 211, 212, 213, 281, 376, 377, 378, 380, 382, 506, 507, 323, 486

[56] References Cited
UNITED STATES PATENTS

| | | | |
|---|---|---|---|
| 2,702,248 | 2/1955 | Guadagni | 99/154 |
| 2,745,217 | 5/1956 | Gold et al. | 99/103 |
| 2,801,925 | 8/1957 | Fisher | 99/154 |
| 2,865,758 | 12/1958 | Weckel | 99/103 |
| 3,097,099 | 7/1963 | Beckmann | 99/158 |

*Primary Examiner*—Norman Yudkoff
*Assistant Examiner*—Curtis P. Ribando
*Attorney, Agent, or Firm*—Mason, Fenwick & Lawrence

[57] ABSTRACT

A process for improving the storage characteristics, appearance and texture of fruit by evacuating air from fruit immersed in a liquid substituting this liquid into the fruit under extremely low pressures. The low pressure is applied from atmospheric down to 200–300mm Hg at a maximum rate of 125mm per minute and from 200–300mm to 2–13mm Hg at a maximum rate of 12mm per minute provided that the total time for both said pressure changes is at least 28 minutes and is followed by a dwell time of at least 1 hour and thereafter the pressure is increased slowly to 60mm Hg at a rate not exceeding 12mm per minute and from 60mm to atmospheric at a maximum rate of 35mm per minute provided that the total time for both said pressure changes is at least 28 minutes. This application of and release of vacuum will result in complete removal of the entrapped gases and impregnate the fruit without damage to the cell structure.

19 Claims, No Drawings

PROCESS OF AIR EVACUATION OF FOODS UNDER ULTRA-LOW PRESSURE

PRIOR APPLICATION

This application is a continuation-in-part of earlier application, Ser. No. 60,765, filed Aug. 3, 1970 and now abandoned.

BACKGROUND OF THE INVENTION

This invention relates generally to a process for treating food such as marine creatures, fruits and vegetables to improve their appearance, texture, storage characteristics and the time necessary for processing these foods for preservation. More particularly, the present invention relates to a process for treating various foods with an extremely high vacuum to remove substantially all gases including deleterious oxygen and substituting for the evacuated gases, a liquid so as to distend the cell walls of the food prior to conventionally processing and preserving the foods.

All natural foods have a limited storage life capacity, due in part to entrapped air in the tissue voids and within the cells of the food and also due to the presence of various enzymes naturally occurring in the foods as well as microorganisms inherently present or picked up during any processing procedure. The present invention is primarily directed to the problems arising from the presence of air which, because it includes oxygen, permits the growth of various organisms producing deleterious results. It is well known, for instance, that various proteins, carbohydrates, naturally occurring pigments, vitamins and delicate flavor constituents are often partially or totally destroyed or modified by the process of oxidation. Obviously, this undesired oxidative process not only adversely affects the appearance of the product but the taste and nutritive value of the food.

Food processors, especially those engaged in operations involving freezing, canning, and dehydration of fruits, vegetables and marine creatures, generally depend entirely on the blanching action of steam or hot water to shrink the products and thus remove air from the tissues. Unfortunately, this process of preheating the product before proceeding with subsequent processing steps serves to remove only a part of the gases from the tissues. Although generally ineffective in removing gases, another function of the blanch is to inactivate naturally occurring enzymes in the product which may cause subsequent deterioration in the processed or dehydrated foods. Certain products, however, such as apples and other fruits are frozen or otherwise preserved without blanching, thus the enzymes in these products remain active and the gases are not removed. Regardless of whether a blanching step is used, there is either an ineffective removal of the gases or no gas removal whatsoever.

It has been recognized that the presence of oxygen is generally undesirable in the sealed container holding the preserved food and various techniques are utilized to reduce the air in the container prior to closing. Among these are such steps as closing under partial vacuum, exhausting the container by heating the container before closing, displacing air in the head space in the filled container through the use of super-heated steam. All of these procedures may reduce the amount of gas present slightly, but there still remains varying amounts of oxygen in the container, whether within the tissues of the food or in the space above the food in the closed container.

The presence of oxygen is particularly undesirable in foods because of the detrimental effects upon preservation and storage characteristics, but also because of the deterioration in the nautral color of fruits. The red color in all fruits, for instance, deteriorates rapidly due to the reaction with oxygen. There is produced as a result of this action, brown to black shades of color. The catalyst for this reaction is sunlight, and it is for this reason that some fruits — particularly cranberries — cannot be packed in other than an opaque container which would shield them from the catalytic rays of light. Cranberries and other similar fruits are, therefore, precluded from being packed in glass containers and lose the consumer appeal that a see-through package commands.

Other color changes are also traceable to the destructive presence of oxygen. Green vegetables, such as brocolli, for instance, lose the desirable green color due to the degradation of the chlorophyll during thermal processing. The discoloration of the tissue of other fruits, such as the browning of apples, by reason of the presence of oxygen has been noted.

Oxygen not only supports deleterious chemical reactions relating to color, but also promotes the growth of microorganisms naturally present in the foods. The microorganisms when permitted to thrive in the presence of oxygen, degrade the cell structure of the tissues in time to produce a rubber like, soft or weak texture which is uncharacteristic of the food and is generally found to be unacceptable by the consumer.

There are also problems in the processing of a number of foods which are to be impregnated with sugar, salt or other material. For example, a sugar concentration that may vary between 30 percent up to 50 percent or 65 percent may be desired. The 65 percent content is usually applied to those fruits which are used for special purposes such as the candied fruits. A sugar concentration of 50 percent is generally required for fruits that are incorporated into ice cream, for example, in order to have a softer, less firm texture upon freezing. Such fruits have often been found, however, to break down in texture after freezing due to the formation of large ice crystals which rupture the cell walls and permit the weeping of impregnated fluid from these cells. The appearance of the ice cream surrounding such a weeping fruit is not considered acceptable.

The impregnation of such fruits as maraschino and Bing cherries with a high sugar concentration has also posed a problem because of the extended time required to incorporate the sugar syrup. Under conventional commercial processing, the cherries in vats or barrels are subjected to the addition of sugar syrup, usually containing various acids such as any of citric, maleic, fumaric, tartaric, etc., various flavors, certified food colors and typical preservatives such as sodium benzoate. The sugar syrup solution must impregnate the cherries by passing through the cell walls of the fruit tissue into the cells and there expel some of the air within the cells. In most instances, however, the sugar syrup solution is simply substituted for the liquid present in the cherries due to previous processing procedures and little, if any, air is evacuated from the cherries. The entire operation for impregnating the cherry with a high sugar content takes an extremely long period of time.

The processing time to reproduce a 50 percent sugar concentration for instance, in the cherry usually requires from 120–144 hours mainly due to the slow exchange of the less concentrated fluids in the cherry for the more concentrated sugar syrup solution through the cell walls by osmosis.

A generally similar process of impregnation is utilized to produce cranberries. A number of variations have been commercially used, but principally the cranberries are immersed in a sugar solution after being pricked, and the solution in time is expected to equilibrate with the interior of the cranberry. Again, this is a slow process, but even more importantly, it is ineffective in producing a quality stable product.

For the cherry and cranberry and for other fruits and vegetables, these techniques fail to fill the cells of the fruit with liquid. The fruit, then, as finally processed, is oftentimes shrunken in size due to the subsequent collapse of the cell walls from heating or freezing. This shrinkage usually appears on the surface as wrinkless or undulations which detract from the appearance of the fruit. Also, there is a loss upon storage of the natural fluid of the fruit from these ruptured cells. In the case of the cranberry or other small seed bearing fruit, the seeds are lost from the fruit and are mixed in the syrup in the final container. The seeds, added to the portions of the broken cells present, produce an undesirable non-clear syrup.

These fruits, therefore, not only require an uneconomically long period of time for processing, but frequently result in a product which is partially shrunken in size, has a tendency to weep, loses portions of its cell structure and contents, possesses poor storage characteristics due to the incomplete removal of oxygen, may change color from its natural state due to oxidation, and promotes microorganism growth. In general, these products often have poor taste, texture, shape and color.

PRIOR ART

It is recognized that prior art procedures attempt to cure certain of these defects through an evacuation of gases present in the various foods and substitution with desirable liquid. The vacuum in any of these methods is usually a maximum of 28 inches of mercury as in Weckel, U.S. Pat. No. 2,865,758. In older methods, equipment was not adequate to obtain much higher vacuums while subsequent continuous procedures are not capable of achieving an extremely high vacuum and remain continuous. These prior art procedures, however, were in part effective in removing some of the deleterious oxygen from the food but never achieved any meaningful improvement in either the storage characteristics or cell integrity. Even a small amount of remaining oxygen is found to be sufficient to support activity of a group of enzymes naturally present in the foods and capable of producing off-flavors and off-colors in the products during storage. The group of enzymes characterized by glucose dehydrogenase, galactose dehydrogenase and 3-hydroxyacid dehydrogenase to mention only a few, are capable of producing undesirable flavor and color alteration in products in the presence of oxygen in the amounts found in prior art products. For example, apple slices frozen after immersion in a solution containing sodium bisulfite and treated to a vacuum even as high as 28 inches of mercury exhibited marked internal browning of the slices after 6 months' storage at 0°F.

Higher vacuums applied did not result in a commercially usable process. Such products subjected to vacuums greater than 28 inches Hg either ruptured the cellular tissue or still left residual gases within the fruit. Whether it was reasoned that whatever gases remained were too small a quantity to produce any problem or that cell rupture was the price to be paid is not certain. It is clear, though, that the prior art never recognized the importance of using only pressures near perfect vacuum combined with exercising great care in a particular manner and for a minimum time in the drawing and release of such vacuum to prevent rupturing the cell tissue. Very low pressures were known to the art as typified by Fisher, U.S. Pat. No. 2,801,925 and Guadagni, U.S. Pat. No. 2,702,248 to exhaust gases from fruits and Weckel suggests slow evacuation and release of vacuum at a maximum of 28 inches of vacuum but no stable unruptured product ever has been made commerical based upon these or any other prior art process. In fact, no process is known that removes and replaces substantially all the gases entrapped within a fruit with an appropriate liquid without permitting any undesirable breakdown in cell integrity.

OBJECTS OF THE INVENTION

It is accordingly the principal object of the present invention to provide a process for the removal of air and other gases from the tissues and flesh of fruits, by completely immersing the product in a liquid and applying and releasing in a unique manner an extremely low pressure to exhaust substantially all of the gases from the food product without rupturing the cellular structure of the fruit.

It is also an object of the present invention to provide a process for evacuation for substantially all of the gases from the food product to enhance the color, texture, flavor and appearance of the product and permit substantially longer storage after conventional packaging.

It is a further object of the present invention to provide a process for greatly exceeding the vacuum applied in prior art commercial processes for evacuation of the gases from products and to remove the substantial volume of remaining gas.

It is also an object of the present invention to provide a procedure for the complete impregnation of high concentrations of sugar or salt solutions into various fruits to thereby reduce the shrinking of the fruit, the freezing time and the weeping of the liquids from the cells by strengthening and distending the cell walls, rendering them less permeable.

Another object of the presesnt invention present the provision of method for the application of extremely low pressures to remove gases that, if present, would react with natural color constituents of the fruit during storage.

Further limited, though an important object of the present invention, is the provision of method for treating cranberries to exhaust substantially all of the gases and maintain the natural red color in a light transmitting package in the presence of light.

Another object of the present invention with respect to cranberries is a process for producing whole cranberries which lose neither their seeds nor cell tissue to a surrounding stable, clear syrup.

These and other objects of the present invention will become apparent after careful study of the following specification and claims.

SUMMARY OF THE INVENTION

It was discovered that, contrary to the prior art beliefs, the previous procedures were totally inadequate to remove the residual gases tenaciously embedded within the cells of the tissues. It has now been found that the presence of these gases in fruits, even if only small in volume, lead to degradation of the cells due to oxidation and microorganism attack. Additionally, the presence of such gases prevent the full impregnation of liquid resulting in a breakdown in cellular integrity due to the formation of large ice crystals during freezing or massive expansion of the gases during a succeeding heat processing step. In effect, the residual gases produced both a chemical and a mechanical or physical destruction of the cells of the fruit.

DESCRIPTION OF THE INVENTION

It has been discovered that the residual gases remaining after exposure to vacuum as high as may have been used in a prior art, permit a residual quantity of oxygen and other gases to remain in the tissue which is larger than might be expected. Even the highest prior vaccums if applied to the fruit would not completely remove the residual gases unless applied for a sufficiently long time and then unless the vacuum was drawn and released in a minimum required time a collapse of the cells would result.

The significance in the ultra reduction in the pressure applied to the food to be processed can be vividly brought out by an experiment conducted with a pound of mushrooms. The mushrooms were cleaned and washed in the usual fashion and immersed in a quantity of water so that the top of the mushrooms were below the level of the water and a vacuum of 28 inches was applied and maintained for 2 hours. During the first 30 minutes of the vacuum, approximately 1 small bubble of air per 10 minutes was withdrawn after the first 30 minutes of the vacuum treatment. After 1 hour and 20 minutes, no further bubbles were forthcoming, indicating that all of the gas that could be removed at 28 inches of vacuum was, in fact, removed. Thereafter, the vacuum was increased to 29.993 inches of mercury and immediately a multitude of bubbles too numerous to count passed through the tube from the vacuum chamber and continued bubbling at a rate of approximately 1 bubble per 5 minutes between 1 hour and 1 hour and 50 minutes. During the next and final 10 minutes for a total of 2 hours, no further bubbles were noted. A more detailed illustration is set forth in Example II.

To illustrate the maximum pressure at which the fruit could be completely evacuated, the following procedure was performed upon a closed flask containing nicked cranberries submerged in syrup.

Vacuum was applied and pressure slowly reduced to dwell points of 635mm Hg, 510mm, 400mm, 135mm, 60mm, 13mm. Temperature was maintained at 20.5°C. during the experiment. Three minutes were allowed at each pressure with 2 minutes allowed for reduction in pressure to the next lower pressure. Essentially, bubbling ceased by the end of each of the three minute dwell times. Gases were collected in flasks. Upon completion of the gas withdrawal, the flasks receiving the gases were placed in a 20°C. chamber and with the bottom stop cock submerged in a tank of water and opened while submerged the flasks were allowed to reach equilibrium of temperature (20°C.). At the end of 2 hours the bottom stopcock on each flask was closed. Flasks were reweighed and loss in weight was determined. By calculation to standard temperature and pressure, the actual volume of gases withdrawn at each pressure reduction was determined (calculated):

| Pressure, mm. Hg. | Vacuum, Inches Hg. | % Gases Withdrawn |
|---|---|---|
| 635 | 5 | 11 |
| 510 | 10 | 23 |
| 400 | 15 | 37 |
| 135 | 25 | 72 |
| 60 | 28 | 81 |
| 13 | 29.5 | 100 |

Determination similar to this in nature, indicated that pressures on the fruits to be processed should not exceed 13mm of mercury for total evacuation. In proportion to the decrease in pressure and the length of time of the application of the high vacuum, the quantity of air evacuated is completely unexpected. It is not understood why such additional lowering of the pressure produces the disproportionate evacuation of gases except for several theories such as the need to exceed the threshhold retention force between the residual gas and the food tissues by means of the ultra-low applied pressure.

It has been discovered, therefore, that the pressure of 13mm is the maximum pressure which may be applied to the fruit immersed in any particular liquid in order to break beyond the barrier holding the residual gases and to substantially evacuate all the gases including the deleterious oxygen. More preferably, the evacuation of the vessel should be down to pressure of 2.0mm. Lower pressures could be used, but since the impregnating solution evaporates quickly, the partial pressure of the liquid sets a practical limit upon the lowest pressure that may be achieved at the temperature range of 20°F – 70°F. The preferable pressure is below 5mm Hg at a temperature range of 30°F – 35°F.

The time for continuing the evacuation procedure of the present invention is quite important. The evacuation of the gases should continue until there are no further gases removed as seen, for instance, from the bubbling through the submersing liquid. Specifically, it has been found that at least 1 hour dwell time is essential for application of the vacuum at pressures between 2 and 13mm Hg. Significant advantages are achieved when the pressure is applied for a period exceeding 1¼ hours and most ideally the maximum advantage of the present invention not obtainable for shorter times is achieved when the vacuum is applied for at least 1¾ hours. For the impregnation of fruits with high solid content solution, longer times are required as mentioned in connection with cherries. Cranberries, for instance, generally require a 1¾ hour dwell time. Generally a 2 hour dwell time is advisable. The total dwell time beyond 2 hours is limited only by economics. The liquid impregnating medium is usually an aqueous solution of sugar or salt, the concentration of which is not critical and may vary from 0 percent to the maximum concentration possible at the working temperature.

Any other soluble flavorings such as spices, etc., may also be included.

The manner of applying and releasing the vacuum applied to the immersed fruit is another important aspect of the present invention. It has been found that in its broadest critical aspects, the reduction in pressure should be continual from atmospheric down to pressure of 200–300mm of mercury, preferably 250mm Hg, at a maximum rate of decrease of 125mm of mercury per minute preferably 50–100mm per minute. The total time of these steps of lowering the pressure must be at least 28 minutes. From this pressure down to the working pressure between 2 and 13mm mercury, the rate of lowering the pressure must not exceed a rate of 12mm per minute. After the dwell time of at least one hour at the lowest pressure, the pressure may be increased up to 55–65mm of mercury, preferably 60mm, at a rate that does not exceed 12mm per minute and from 55–65mm to atmospheric at a maximum rate of 35mm per minute. The total time for these steps of raising the pressure musst be at least 28 minutes.

These pressure reductions and release times are particularly critical above and below the low pressure attained during the dwell time and require the slow rates of 12mm per minute maximum. The preferable total minimum time for each step is from 760mm to 250mm in 5 minutes at a preferable rate of 100mm per minute, from 250 to the dwell pressure in about 25 minutes at a preferable rate of 10mm per minute a 1 hour dwell, 5 minutes to release vacuum to 60mm at a preferable rate of 10mm per minute and 25 minutes from 60mm – atmospheric at a preferable rate of 30mm per minute. The total time for the evacuation and impregnation is at least 1 hour and 56 minutes and preferably greater than 2 hours. Greater times may be used in any or all steps up to 20 times the periods given or greater.

Increasing the times for accomplishing each step by lowering the maximum rate of pressure change to the above preferable rates significantly improves the characteristics of the resulting products out of proportion to the magnitude of the changes.

It has been found that during the lowering of pressure and the build up, that there are critical pressure areas in which the cellular structure is particularly sensitive to pressure changes. To avoid rupturing of the cells and also to insure complete removal of the gases, the rate of build up and release of the pressure are important.

It is also found that not greater than 50 percent by volume (STP) of the gases should be removed in the initial step of lowering of the pressure to 200–300mm Hg.

It has been theorized that the specific manner of reducing the pressure and building up pressure after the proper dwell time is important principally due to the fact that air and other gases expand a significantly greater volume than liquids under the imposition of a vacuum. By slowly reducing the pressure to and particularly below 200–300mm Hg over an extended period of time of at least 28 minutes at maximum rates of 125mm per minute and 12mm per minute respectively for each period, the gases naturally present in each fruit cell initially cause a distension of the cell wall thus increasing the volume of each cell. The cell being semipermeable, the gases gradually migrate through the cell wall and are quantitatively displaced with the liquid medium into which the fruits have been submerged. The gases escape as bubbles into the medium and are drawn off by the vacuum. Reduction or increases in pressure exceeding the stated limits results in the cell walls rupturing before the gases are able to migrate through the wall and be replaced by liquid.

To avoid rupture of the cells after the present vacuum treatment all the gases must have been evacuated and the cells filled with liquid. The evacuated fruit then is at osmotic equilibrium with its surrounding liquid medium. These equilibrated fruits so evacuated and impregnated with liquid medium are then capable of withstanding adverse conventional thermal processing that may be thereafter employed to preserve the fruits.

When properly treated in accordance with the present invention, no gases remain in the fruit to expand into the far greater volume than would be expected for liquid expansion, thus the cells of the fruit being devoid of gases are not subject to the various degrees of collapse of tissue otherwise occurring in heat processing. Such collapse of tissue results in the softening of the entire fruit and a loss of cell integrity. Without the presence of gases during the heat processing step, the cell wall will inherently thicken as a result of the reaction among the natural fruit acids, pectin and sugar which may be present to various degrees. This thickening forms a gel which coats the cell walls to further aid in minimizing the loss of cellular fluid during storage. By permitting the thickening of the cell walls in the tissue due principally to the gelling of the natural fluids and solids in the fruit, subsequent heating such as in the packaging or even the baking of pies or casseroles substantially eliminates the normal destructive effect of heating due to the ability of heat to transfer rapidly through the medium and into the equilibrated fruit.

Upon freezing, the fruit treated in accordance with the present invention, the fruit freezes more rapidly and more uniformly. Ice crystals which otherwise would be rather large and capable of puncturing the cells to create a loss of cellular material, are maintained significantly smaller, thus minimizing the number of cells that would be ruptured either by freezing or defrosting. The capability of the fruit so processed to withstand the rigors of freezing and defrosting and yet continue to retain its normal shape and texture without loss of weight, is one of the significant advantages of the present invention.

The process of the present invention may be understood from a general example using preferred but not essential items of equipment. It is only significant to utilize apparatus which is capable of producing, maintaining and withstanding the ultra-low pressure and which has means for retaining the products treated below the surface of the liquid placed in the vessel. Additionally, suitable inlets and outlets for the liquid must be located on the vessel.

The following procedure will generally describe the manner of achieving the benefits of this invention:

The fruits are conventionally prepared by washing, peeling, cutting, or dicing as required. The product is then placed in a vessel made of non-reactive material such as stainless steel, steel covered with plastic material, or any structurally sound material that can be sanitized readily. The vessel is preferably equipped with an inlet port located at or near the top. Immediately below the port, the entire surface of the vessel is partitioned off by a perforated plate of non-reactive metal which forms a false chamber in the top of the vessel. After the vessel is filled to capacity with product, below the false top, the port is securely fastened to exclude air and the vessel is filled from a pipe at the top with the desired solution. The level of the solution is adjusted to completely cover the product and to maintain a level approximately one-half inch above the perforated top throughout the process. This assures complete coverage of the product with solution. The solution inlet pipe is now closed. A mechanical pump or venturi steam evacuator operating to produce a vacuum is activated to draw a vacuum on the vessel from a pipe located at the top of the vessel. When steam venturi is used, it operates only to reduce pressure to about 20 inches of vacuum. It is recommended that a high performance pump take over and complete the evacuation of the remaining air and gases. In order to avoid the necessity of outsized pumps, it is recommended that a condenser be positioned before the inlet side of the pump to condense the vapors that may be withdrawn from the vessel. The condenser may be liquid cooled and generally should cool the vapors to a temperature of 10° to 15°C preferably, or −20° to +30°C. Such a condenser will substantially reduce the volume of the vapors that must be handled by the vacuum pump.

The vacuum reacts by destroying the threshhold barrier and displacing gases in the tissues of the product until essentially all of the gas is withdrawn. The more complete evacuation obtained, i.e., the lower the pressure within the range of 2–13mm Hg during the dwell time, the less time required for complete displacement of the gases with liquid surrounding the product. Whatever the specific absolute pressure within the specified range, it is necessary to lower the pressure from atmospheric to 200–300mm at a maximum rate of 125mm per minute and from 200–300mm Hg to 2–13mm Hg at a maximum of 12mm per minute, provided that these steps of lowering the pressure consume at least 28 minutes before the 1 hour minimum dwell time at the lowest pressure and thereafter to increase the pressure up to 55–65mm at a rate not exceeding 12mm per minute and from 55–65mm to atmospheric at a maximum rate of 35mm per minute provided that these steps of lowering the pressure consume at least 28 minutes. Evacuation of gas and replacement with liquid is complete in a minimum of 1 hour and 56 minutes which may be broken down into pressure reduction and pressure build up periods of at least approximately 28 to 30 minutes duration and a dwell time of at least 1 hour. Any of these times may be up to 20-fold greater than the minimum with corresponding decreases in the rates of drawing and releasing the vacuum.

Upon retaining atmospheric conditions, a port in the bottom of the vessel is opened and the product and liquid drain out of the vessel. Product and liquid then pass over a draining screen or vibrating separator from which the product may or may not go into water or a steam blancher. Blanching inactivates the enzymes present and shrinks the product which squeezes out excess liquid without allowing air or other gases to enter the tissue.

Another method employed is to partially fill tubs with the produce, cover with a perforated top and fill the tub with the desired solution to a point above the level of the product. The tubs are then wheeled into a chamber capable of withstanding a pressure of 2mm Hg. Thereafter, the product may be preserved by canning, freezing or even dehydration in the usual manner.

The following specific examples will illustrate with some precision the particulars of the present invention and the distinctions over prior art methods.

EXAMPLE I — CRANBERRIES

Exhaustive comparisons were made with cranberries processed by methods described in Weckel, U.S. Pat. No. 2,865,758; Fisher, U.S. Pat. No. 2,801,925 and the present process.

A. Comparative Example No. 1 - Treatment by Weckel Process U.S. Pat. No. (2,865,758):

Submerged 5 pounds of nicked cranberries in 7 pounds of syrup of 62.5° Brix containing 2.7 grams calcium chloride, which furnished a calcium content of 0.05 percent to the batch.

Procedure of treatment:

Cranberries were submerged in syrup in a tub and placed in vacuum chamber, pressure was reduced linearly to 28 inches vacuum in 25 minutes, pressure maintained for 25 minutes and returned to atmospheric linearly in 25 minutes. Cranberries and syrup were then transferred to stainless steel pot and heated to 180°F. Cranberries were filled at 117.5 grams to a jar, covered with hot syrup, closed and processed for 20 minutes at 180°F., then removed from process and air cooled to room temperature. They were then placed in cases and identified as No. 1.

B. Comparative Example No. 2:

Repeated Comparative Example No. 1 exactly, but omitted calcium chloride addition.

C. Comparative Example No. 3 - Treatment by Fisher U.S. Pat. No. 2,801,925:

Five pounds of nicked cranberries were placed in a dry vacuum chamber and heated to 140°F., pressure was reduced linearly to vacuum of 25 inches of Hg in 10 minutes and allowed to remain at this vacuum for 30 minutes. Valve in port at top of chamber was opened and a syrup weighing 7 pounds with a Brix of 62.5° was drawn into the tube to flood the berries while maintaining 25 inches of vacuum. Flooded berries remained at a vacuum of 25 inches for 15 minutes, then the pressure was returned to atmospheric linearly in 5 minutes. The cranberries were removed from the chamber and air cooled to room temperature (73°F) and allowed to stand for 48 hours. Berries and syrup were placed in stainless steel pot, heated to 180°F., filled into jars including hot syrup, closed and processed for 20 minutes at 180°F. Jars removed from water bath and air cooled, cased, and marked No. 3.

D. Comparative Example No. 4 — Fisher:

Five pounds of cranberries were placed in a tub, placed dry in a chamber. The pressure was reduced linearly to about 2.0mm Hg in 15 minutes, temperature of berries and chamber was 60°F. Vacuum was maintained at 2.0mm for 30 minutes. The valve in port at top of chamber was opened and flooded berries with 7 pounds of 62.5° syrup at 60°F. while maintaining 2.0mm vacuum, berries remained at this vacuum for 15 minutes and then the pressure was returned to atmospheric linearly in 5 minutes. Berries were removed from the chamber and held at room temperature for 48 hours. Berries were then processed exactly as for No. 3 above.

E. Comparative Example No. 5:

Repeated No. 1 exactly but substituted alum (potassium aluminum sulfate) to supply aluminum at concentration of 0.05 percent to entire batch.

F. The Present Invention Process — Comparative Example No. 6:

Five pounds nicked cranberries were placed in a tub and covered with 7 pounds of 62.5° Brix syrup. The tub was placed in a vacuum chamber and pressure reduced uniformly to 250mm Hg absolute in 5 minutes and then to 10–12mm Hg at a rate of 10mm per minute, the pressure of 10–12mm Hg was maintained for 1¾ hours. Pressure returned to 60mm Hg (absolute) at a rate of increase of 10mm Hg per minute in 5 minutes and thereafter gradually increasing the pressure for 23 minutes to atmospheric at a rate of 30mm per minute. Berries and syrup were placed in stainless steel pot and heated to 160°F. Berries were filled into clear glass jars, jars then filled with hot 160°F. syrup, and closed. Jars were then inverted to sterilize lid and air cooled.

In all of the above comparative examples 1 through 6, exactly 5 pounds of nicked cranberries were treated with 7 pounds of 62.5° Brix syrup. Each jar was filled with exactly 117.5 grams (4.14 ounces) of cranberries before syrup was filled into the jars.

It should be stressed that cranberries treated by the present vacuum process do not require heating above 160°F. for preservation, whereas other processes — Weckel, for instance, — requires at least 180°F. to 200°F. fill temperature plus 20 minutes processing of the closed containers in water at 180° to 200°F. The berries of the present invention require no thermal processing after placing in jars at 160°F.

This is brought about by the absence of oxygen in the tissues of the berries which would support the growth of microorganisms of the type which could grow in the highly acid conditions which is attained in the berries and syrup pack.

rable Example No. 6 of the present invention shows complete osmotic equilibrium as having been established by proper vacuum application.

3. Appearance:

a. When the lids were removed from the glass jars, all of the cranberries except Comparable Example No. 6, wrinkled immediately. The change in pressure (jars had average vacuum of 10 inches) causes collapse of tissues with wrinkling and dimpling of all of the berries. Cranberries produced by the present process (No. 6) retain full round symmetry of the berry with no dimpling.

b. Syrup in all of the jars except Comparable Example No. 6 show from a few to many seeds which detracts from appearance of the fruit. This is caused by disintegration of surface of some of the berries in every jar and subsequent escape of seeds from fruit interior (see number of damaged fruit in Table No. 1).

4. Color:

After 2 weeks of storage in clear glass jars under identical conditions of natural daylight, all of the samples of Comparable Example No. 1 through Comparable Example No. 5 showed some color changes and in the case of Comparable Example No. 4, the berries had become dark. After 30 days of storage, change in color ranged from noticeable to very dark in all of the samples except for Comparable Example No. 6 (present process). Cranberries of this invention retained the bright, normal cranberry color after 30 days of storage. In previous experiments, cranberries held for one year in natural daylight still retained a normal cranberry color processed by the present method.

5. Texture:

Cranberries to which calcium salts were added were

SPECIFIC EXAMPLES

Table No. 1

Comparison of yield, color, texture and conformity of processed cranberries 30 days after processing (5 jars of each sample were used for comparison):

| Treatment Comparative Example Number | Yield Lbs. | % | Brix Berries | Syrup | Appearance Fruit | Syrup | Texture | Damaged Berries |
|---|---|---|---|---|---|---|---|---|
| 1 (Weckel) | 5.32 | 106% | 40.6° | 43.0° | Wrinkled | Some Seeds | Sl. Soft | 3% |
| 2 (Weckel) | 5.30 | 106% | 39.3° | 44.6° | Wrinkled | Some Seeds | Soft | 7% |
| 3 (Fisher) | 5.86 | 117% | 41.8° | 43.0° | Wrinkled | Many Seeds | Soft | 7% |
| 4 (Fisher) | 6.71 | 134% | 41.0° | 44.6° | Wrinkled | Some Seeds | Sl. Soft | 11% |
| 5 (Weckel) | 6.13 | 122% | 40.0° | 44.0° | Wrinkled | Many Seeds | Firm | 2% |
| 6 (Pres. Inv.) | 6.80 | 136% | 43.2° | 43.3° | Smooth | No Seeds | Firm, Crisp | 0 |

It may be observed from the above:

1. Yield:

a. Greatest weight gain is achieved by drawing a near perfect vacuum (Comparable Example No. 4 and No. 6).

b. Greatest gain is achieved by slow withdrawal of air and gases and slow return to atmospheric pressure provided the vacuum is applied for 1¾ hours. (Comparable Example No. 6 - Present Invention). NOTE: Use of high vacuum in Comparable Example No. 4 (Fisher) resulted in a high yield but many ruptured berries. This high weight gain was thereafter lost upon storage.

2. Brix:

a. Measurement of sugar content (Brix) of cranberries and syrup separately further proves that osmotic equilibrium has not been established and after heat has been applied to the fruit, there is little chance that equilibrium will ever be completely achieved. Only Compaslightly soft (Comp. Ex. No. 1). In Comparable Example No. 2 and No. 3, berries were definitely soft showing influence of lower vacuum — 28 inches and 25 inches respectively — and poor displacement of air and gases in tissue with no additives to artificially induce firmness. In Comparable Example No. 4, the berries were slightly soft in spite of near perfect vacuum because of rapid lowering of pressure, short duration of low pressure and rapid rise in pressure plus the fact that for only a portion of the total time at low pressure were the berries exposed to surrounding syrup. This negated the value of allowing the berries to stand for 48 hours in the syrup after the vacuum treatment. This 48 hour stand would be infeasible in commercial production because of the size of installation it would require. Berries produced in Comparable Example No. 5 using aluminum salt as a synthetic firming agent to artificially set the pectins in the fruit and were therefore quite firm.

The skins were somewhat tough as a result of reaction of aluminum giving an apparent firmness to the fruit.

Berries produced by the present process (Comp. Ex. No. 6) were entirely and uniformly firm and were a completely different product from the other samples in that they were crisp, with a crunchy mouth feel when chewed. This is the result of having essentially every cell in the cranberry turgid with the syrup which had displaced air and gases within each cell wall.

6. Baking Test:

Pies were baked with cranberries from each of the experiments. In all of the pies except those made using the present process, the cranberries completely lost their identity insofar as wholeness is concerned. Berries from Comparable Example No. 5 retained near the maximum integrity obtained for Comparable Example No. 6, but their percent wholeness was only approximately 60 percent of the units. The skins of the cranberries of Comparable Example No. 1 through No. 5 were very tough and leathery and the berries had a slight off-flavor from the aluminum salt added. Pies made from Comparable Example No. 6 retained their wholeness, were still crunchy and retained their typical bright color after baking. Additional heating of the cranberries, such as baking, further accentuates the difference between the present invention and berries treated by other vacuum processes. Samples dramatically demonstrate that the present process produces a highly desirable product, much better in every way than the other processes.

The following advantages are apparent in the cranberries produced according to the present process as compared to those of the prior art:

1. The present cranberries require no further process after being placed in the container hot, as opposed to all of the other processes known in the industry.

2. The present cranberries require no additives to aid in preservation, color retention or to artificially induce firmness to the products.

3. In the present process the cranberries retain their original crisp and crunchy texture and do not become soft or leathery as they do when processed by the other methods.

4. Color of cranberries by the present process remain normal during process and storage as opposed to cranberries produced by other methods.

5. In the present process the weight of the product is stabilized at the packaged weight. Initial weight gain by the present process is greater than that achieved by the other processes.

6. By the present process, the syrup remains clear and free of seeds and particles of cranberry, as opposed to cranberries produced by other methods.

7. When containers of cranberries are opened at atmospheric pressure, those processed by the present invention retain their original round plump, symmetrical shape while all of the fruits processed by the other methods tend to wrinkle and become dimpled.

8. The present process requires less equipment and labor input than any other known vacuum process.

The present process recognizes that cranberries are composed of roughly 88 percent liquid and other components and a small amount (about 1 percent) of gases. The fact that the air and gases expand at about 18 times the rate of water or liquid in the presence of heat and, partially, under vacuum, is what makes presence of these elements, even in very small amounts, so important. And it is essential that the gases and air are removed very carefully in a narrowly controlled range of low pressure, time of vacuum application, time of dwell and time of release to atmospheric pressure again. It is equally important that as the air and gases are removed from the cells, that they are immediately and completely filled with liquids, under controlled conditions to prevent rupture of the cells. The actions of displacement of air and gases with liquids into the cells must be simultaneous and under carefully controlled conditions. By proper application and release of vacuum, the cells are thus sealed and future loss of liquids and/or collapse of the cells are prevented. Also, air and gases are the enemy of color in cranberries and other fruits and vegetables, thus removal of essentially all of the air and gases as described herein is essential to retention of good, normal color in the products during storage.

The following are other specific examples of the wide range of fruits that may be processed in accordance with the present process.

EXAMPLE II — MUSHROOMS

Exactly 100 pounds of mushrooms, commercially referred to as "cut" mushrooms, that is, whole mushrooms with only roots cut from each unit were taken from 24 plastic crates of nine pounds each crate. Mushrooms with obvious defects such as broken units, units with roots attached and those with widely open veils were removed. The mixed bin of mushrooms varied in size from a diameter of ⅝ inch to 1¾ inches. The lot was equally divided into two lots of exactly 50 pounds each.

Vacuum Treated Lot

The 50 pounds of mushrooms were washed on screens by sprays of water and placed in a plastic bin, they were leveled in the bin and covered with a rigid plastic sheet containing ⅜ inch perforations which fitted tightly against the sides of the plastic bin. The cover was weighted with plastic pails partially filled with water. The mushrooms were covered with a 2 percent brine (sodium chloride) solution to 3 inches above level of mushrooms and cover. The tub of mushrooms was placed in a vacuum chamber connected through a refrigerated condenser to a two stage vacuum pump. Temperature of brine and mushrooms was 56°F. The chamber was closed and vacuum pump started.

Pressure was reduced to 250mm Hg at a rate of 100mm Hg per minute and then down to 10mm Hg at a rate of 10mm Hg per minute for a total time of about 29 minutes. Vacuum treatment at a pressure of 10mm mercury was continued for 2 hours. At the end of 2 hours, the vacuum pump was shut off and a valve between the pump and the chamber was closed. A valve to let air into the vacuum chamber was opened and the pressure in the chamber was returned to atmospheric pressure by increasing the pressure to 60mm Hg in 10 minutes at a rate of approximately 5mm per minute and then to atmospheric at a rate of approximately 35mm per minute for a total time of pressure increase of about 30 minutes. The tub of mushrooms was removed from the vacuum chamber, brine was drained from the mushrooms which were then reweighed. The weight of the vacuum treated mushrooms was 73.75 pounds. The vacuum treated mushrooms were blanched in a thermo-screw steam blancher for 5.5 minutes. Weight of the blanched mushrooms was 43.75 pounds. Blanched mushrooms were plunged into cold water and cooled to below 70°F. Cooled mushrooms were filled into cans at 8 ounces ±.1 ounce, a salt tablet was added and boiling water was added to cans to overflow. Cans were conveyed automatically to a "paddle packer" (a means of controlling headspace), cans were then sealed automatically, placed in retort crates and thermally processed for 27 minutes at 250°F. Cans were then cooled in running water, air dried and cased and cartons marked "treated".

The number of cans filled was 87. Calculated on original weight of 50 pounds of raw mushrooms, this is a yield of 87 percent, or conversely, a loss of 13 percent from raw to canned weight. Further results of testing of canned product is found in Table No. 2.

Control - (Conventional Commercial Procedure)

Fifty pounds of mushrooms (one-half of the 100 pound lot) were soaked, after washing, for three hours in 2 percent brine solution, while the vacuum treatment was being applied to the treated mushrooms as described above. The control mushrooms were drained and weighed after soaking and the weight was 55.5 pounds. The control mushrooms were blanched 5.5 minutes, plunged into cold water, drained and reweighed, the weight was found to be 32.0 pounds. Blanched control mushrooms were filled into cans at 8 ounces ±.1 ounce, a salt tablet added to each can and filled to overflowing with boiling water. Cans were automatically conveyed to the "paddle packer", sealed and retorted (thermally processed) for 27 minutes at 250°F. Cans were cooled in running water, air dried and cased, the cases were marked "control". The number of control cans filled was 64. Calculated on original weight of 50 pounds of raw mushrooms, this is a yield of 64 percent, or conversely, a loss of 36 percent from raw to canned weight. Further results of testing of canned product is found in Table No. 2.

TABLE NO. 2

Ten cans of "treated" and "control" mushrooms were examined after 48 hours from processing and after 30 days from processing.

| 48 hours from processing | | | | | |
|---|---|---|---|---|---|
| | Color | | Texture | | |
| Treatment | Range | Average | Range | Average | Flavor |
| Control | B to D | D | A to B | B | Sl. Weak |
| Vacuum | A to B | A | A to B | A | Typical |
| 30 days from processing | | | | | |
| Control | A to B | B | A | A | Sl. Weak |
| Vacuum | A | A | A | A | Typical |

Based on data gathered during processing and upon examination of cans of product, the following facts are readily apparent:

1. Vacuum treatment of mushrooms under carefully controlled conditions of time and temperature produces a stable product, free of air, oxygen and other gases in the mushroom tissues.
   a. Color of the mushrooms vacuum treated prior to processing is light tan characteristic of mushrooms. Mushrooms processed conventionally must be stored for at least several months to allow bleaching of the mushroom tissue by stannous salts dissolved from tin of the container. Such storage is not required of vacuum treated mushrooms. It is of great importance that no darkening occurs in vacuum treated mushrooms during processing because essentially all of the oxygen has been displaced by liquid in the mushroom cells. Vacuum treated mushrooms, therefore, can be shipped and sold immediately after processing.
   b. Firm texture of thermally processed vacuum treated mushrooms occurs immediately after cooling. In the case of conventionally processed mushrooms, several weeks must elapse to allow mushrooms to "set" the texture, that is, to lose their "spongy" mouth feel.

2. Vacuum treatment results in a significant saving to the processor by a lowering of losses in weight attendant to processing mushrooms. Average weight loss throughout the mushroom processing industry approximates 40 percent. That is, for each 100 pounds of mushrooms with roots removed purchased by the processor, he actually processes 60 pounds of mushrooms. By vacuum treating mushrooms by the present process, losses are reduced to less than 20 percent.

The following summary of data relating to the treatment of mushrooms further illustrates the significance of not only the low pressure, but the times and rates of application of the pressure changes:

1. Lower pressure to less than 13mm Hg in 10 minutes, retain this pressure for 2 hours, return to atmospheric pressure in 30 minutes with the mushrooms constantly submerged, produced an average weight yield of 71 percent.

2. Lower pressure to less than 13mm Hg in 30 minutes, retain this pressure for 2 hours, return to atmospheric pressure in 10 minutes with the mushrooms constantly submerged, produced an average weight yield of 74 percent.

3. Lower pressure to less than 50mm Hg in 30 minutes, retain this pressure for 2 hours, return to atmospheric pressure in 30 minutes with the mushrooms constantly submerged, produced an average weight yield of 66 percent.

4. Lower pressure to less than 13mm Hg in 30 minutes, retain this pressure for 2 hours, flood mushrooms with brine while maintaining this pressure and return to atmospheric pressure in 30 minutes produced an average weight yield of 64 percent.

5. Lower pressure to 250mm Hg at a rate of 125mm per minute, then to 13mm Hg at a rate of 10mm Hg per minute in a total time of 28 to 30 minutes, retain this pressure of 13mm Hg for 2 hours, raise to 60mm Hg at a rate of 10mm per minute and then to atmospheric at a rate of 35mm Hg per minute in a total time of pressure increase of 28 to 30 minutes, the mushrooms constantly being submerged, produced an average weight yield of 84 percent.

It is established, therefore, that reduction in pressure to less than 13mm Hg and the increase in pressure to atmospheric must be accomplished no more rapidly than 28 minutes each to assure greatest yield and highest quality product. It is critical to substantially remove all air and gases and replace them with liquid in the mushroom cells to obtain osmotic equilibrium between the mushrooms and the surrounding medium.

EXAMPLE III — APPLES

Vacuum Treated

Apples of Staymen variety were peeled, cored and sliced with automatic equipment in a commercial apple processing plant.

Five thousand grams of apple slices were placed in a plastic tub and covered with a rigid plastic plate containing ⅜ inch perforations. The plate was weighted with water. Apple slices in the tub were covered to 3 inches over the plastic plate with syrup composed as follows: water – 1,600 parts; sugar – 400 parts; sodium bi-sulfite – 0.384 parts; calcium chloride – 2.0 parts.

This syrup provided a quantity of sulfur dioxide based upon syrup and apples of 75 parts per million. Temperature of syrup and apples was 60.5°F. Tub of apples was placed in a vacuum chamber which was sealed. A two stage vacuum pump connected through a refrigerated condenser to a vacuum chamber was started and vacuum gradually drawn and released as in Example II except that the pressure was 13mm Hg.

The tub of apples was removed from the chamber, apples were drained free of syrup and weighed. The treated apples weighed 6,045 grams, a gain of 20.9 percent. Treated apples, with no syrup added, were divided into 3 equal portions of 2,000 grams each and placed in friction lidded cans. Two of the cans were stored in a commercial blast freezer within 4 hours. One can was held at room temperature for 20 days. Forty-five grams of apples were sealed in a jar for immediate analysis.

Control

The 6,045 grams of the same lot of apples described above were treated in normal commercial manner by soaking for 4 minutes in the same solution as the vacuum treated apples except the standard commercial volume of sodium bisulfite was used to produce 1,600 parts per million sulfur dioxide. Soaked apples were drained, 2,000 grams were placed in each of 3 friction lidded cans. Two cans were stored in a commercial blast freezer after 4 hours at room temperature. One can was held at room temperature for 20 days. Forty-five grams of apples were sealed in a jar for immediate analysis.

Table No. 3

Chemical Analysis Samples of Apple Slices.

| Core of Apple Slices Treatment | Brix | ppm SO$_2$ | Flavor |
| --- | --- | --- | --- |
| Control | 10.7° | 16. | Strong Sulfite |
| Vacuum Treated | 14.6° | 70. | Very Slight Sulfite |
| Whole Slices Control | 12.8° | 395. | Strong Sulfite |
| Vacuum Treated | 14.6° | 72 | Very Slight Sulfite |

These results confirm penetration of sulfur dioxide and sugar from the syrup uniformly through the apple slices during the vacuum treatment.

Table No. 4

Comparison of quality, texture and drained weights of defrosted frozen apple samples.

| Treatment | Drained Weight | Penetrotometer Reading ⅛" probe | Internal Browning Total | Serious |
| --- | --- | --- | --- | --- |
| Control | 1730 g. (86.5%) | 8.1 lbs. (av. 30 sls.) | 7.8% | 3.8% |
| Vacuum Treated | 1920 g. (96.0%) | 10.9 lbs. (av. 30 sls.) | 1.0% | None |

1. The significant difference in drained weights shows that freezing ruptured many cells of the untreated control apple slices causing loss of liquids. This reduces the numbers of pies that can be produced from a can.

2. Texture of treated fruit was crisp even after freezing and defrosting whereas the control fruit was flabby and rubbery, not characteristic for Staymen apples.

3. Very serious "Browning" occurred in control apples due to enzyme activity not inhibited by sulfur dioxide as a result of poor penetration into the center of the slices. For high quality of pies, units with serious browning would have to be removed by sorting.

Table No. 5

Evaluation of apples stored at room temperature (73°F) for 20 days:

| Treatment | Drained Weight | Penetrometer Reading | Internal Browning Total | Serious | Yeasts per g. | Molds per g. |
| --- | --- | --- | --- | --- | --- | --- |
| Control | 1490 g. (74.5%) | 6.1 | 21.0% | 16.0% | 98500 | 2900 |
| Vacuum Treated | 1870 g. (93.5%) | 9.8 | 5.0% | 0.5% | 200 | 120 |

1. Control apples were entirely unusable due to discoloration and fermented odor and flavor.

2. Vacuum treated apples were usable and maintained relatively good flavor and aroma. This is due, primarily to absence of oxygen in the tissues to support growth of microorganisms and uniform concentration of sulfur dioxide throughout the tissues which prevents both growth of microorganisms and inhibits enzyme activity causing browning.

3. Vacuum treated apples retain liquid in cells because of thickening of the cell walls by swelling of pectins and starches lining the cells due to the reaction of the sugars, pectins, starches and fruit acids.

Table No. 6

Evaluation of pies baked from frozen apple samples:

| Treatment | Pie Raw Weight | Pie Baked Weight | Texture of Fruit | Aroma & Flavor |
|---|---|---|---|---|
| Control | 1060 g. | 785 g. (74%) | Rubbery, soft | Weak, Sl. Sulfite |
| Vacuum Treated | 1060 g. | 920 g. (87%) | Firm, crisp | Typical, fresh, no sulfite |
| Fresh Apples | 1060 g. | 885 g. (83%) | Slightly soft | Typical, fresh, no sulfite |

1. Defrosted apples were blended with sugar, starch and water. Apples and starch slurry were heated to boiling to thicken starch. Exactly the same weight of slurry was placed in identical weight pie crusts. Pies were baked on the same shelf of the oven at the same time.

2. Comparison was made among control fruit, vacuum treated fruit and freshly peeled fresh Staymen apples.

3. Results show that vacuum treated fruit retains liquid in tissues during baking better than control or fresh apples. Eating quality of vacuum treated fruit is superior to control and fresh apples.

4. Vacuum treatment of apple slices in addition to the most common syrup addition, can be used to impregnate slices with appropriate amounts of apple essence, spice oils and other liquid flavoring agents to improve flavor of very bland apples with good cooking characteristics. Apple slices can be colored uniformly throughout slices with liquid coloring agents, etc.

5. Vacuum treated apples, due to firm, crisp texture can be used successfully in salads, cocktails and as decoration on cakes, etc.

EXAMPLE IV
Strawberries

Fresh Florida 90 (St. Augustine) variety strawberries grown in Mexico were capped manually and placed in a common plastic tub. Exactly 20 pounds of whole berries were weighed into each of four plastic tubs. Brix of the strawberries was 7.8°. All of the berries were covered in their respective tubs with a syrup composed of 20 percent sugar and 0.5 percent citric acid. The berries were submerged in the tubs of syrup by placing a rigid plastic cover with ⅜ inch perforations over the berries and weighting the covers with plastic buckets partially filled with water. Treatments applied to the fruits in the various tubs were as follows:

Tub No. 1 - control: Strawberries were soaked in the syrup for 4 hours.

Tub No. 2 - Tub of strawberries placed in a vacuum chamber, pressure was reduced to 50mm Hg in 30 minutes, this pressure retained for 2 hours and then the chamber was returned to atmospheric pressure in 30 minutes.

Tub No. 3 - Tub of strawberries placed in a vacuum chamber and vacuum treated as in Example II.

Temperature during all of the treatments was maintained at 58° to 60°F.

Following the treatment, all of the samples were frozen in friction lidded cans in a blast freezer to −13F. and stored for 10 days at 0°F.

Table No. 7

Comparison of the samples of strawberries defrosted for 36 hours:

| Treatment | Drained Weight | Penetrometer Reading, pounds Range | Average |
|---|---|---|---|
| Tub No. 1 | 12.5 lbs. (61.3%) | 0.7 to 1.0 | 0.8 |
| Tub No. 2 | 14.6 lbs. (73%) | 0.9 to 1.1 | 1.0 |
| Tub No. 3 | 15.2 lbs. (76%) | 0.9 to 1.3 | 1.1 |
| Tub No. 4 | 16.0 lbs. (80%) | 1.1 to 1.4 | 1.2 |

The above illustrates that both the degree of air and gas evacuation of the fruit and displacement with syrup, and the rate at which vacuum is achieved and then returned to atmospheric pressure have a very significant effect on drained weight and texture of the strawberries. Slow withdrawal of air and gases (tub No. 2) to partial removal (50mm Hg pressure) improves the yield and texture over control (tub No. 1).

Rapid withdrawal of air to essentially complete vacuum (tub No. 3) and rapid return to atmospheric pressure improves the berries over the control and tub No. 2.

Maximum effect is dramatically and unexpectedly achieved by slow evacuation of gases and air from the tissue, causing displacement with syrup through cell walls without collapse of the tissues and a slow return to atmospheric pressure causing further penetration of syrup through cell walls with a sealing effect (tub No. 4). Treatment No. 4 following the present invention results in retention of maximum quantity of firm strawberries for production of preserves for example. Greater wholeness of fruit is important for high quality preserves or use in fruit salads, cocktails, ice cream, etc.

EXAMPLE V — BROCCOLI

One of the principal problems encountered in processing broccoli by freezing is the toughening of the skin during blanching, defrosting and cooking. Young tender broccoli spears break cleanly immediately after severing from the plant. After being held for several hours, following cutting, trimming, blanching and freezing, the layers of cells comprising the skin becomes very leathery. This is partially due to enzyme acitvity and dehydration of the skin cells. The weight loss in conventionally processed and frozen broccoli is also significant due to ruptured cells losing liquid during defrosting and final cooking.

Control — Conventional Commercial Process

Twenty pounds of fresh cut, uniform sized whole broccoli spears, trimmed to length for 2 pound institutional frozen food cartons, were equally divided into two 10 pound lots. The control treatment included submerging spears in a plastic tub at 58°F. for 3 hours, blanching in flowing steam for 8 minutes, after which it was plunged into cold flowing water to cool to below 60°F. Exactly 2 pounds were packed into the cartons, which were over-wrapped with cellophane wrap and frozen in a plate freezer. Frozen broccoli was stored for 10 days at 0°F. The spears were defrosted and cooked for 5 minutes in boiling water for the comparison tests.

Vacuum Treatment

Vacuum treatment involved submerging the broccoli spears in water at 58°F. and placing them in a vacuum chamber for vacuum treatment as in Example II.

The vacuum treated broccoli was blanched in flowing steam for 8 minutes, plunged into cold flowing water and cooled to 60°F. Spears were packed at exactly 2 pounds into cartons, over-wrapped with cellophane wrap and frozen in a plate freezer. Frozen broccoli was stored for 20 days at 0°F. Spears were defrosted and cooked for 5 minutes in boiling water for the comparison tests.

Table No. 8

Comparison of yield, color and texture broccoli spears:

| Treatment | Blanched Weight | Cooked Weight | Pressureometer Reading, lbs. | | Color |
|---|---|---|---|---|---|
| | | | Blanched | Cooked | |
| Control | 7.7 lbs. | 6.7 lbs. | 17 | 18 | Yellowish-green |
| Vacuum Treated | 9.4 lbs. | 8.3 lbs. | 13 | 13 | Deep green |

Improvement in yield by the vacuum treatment was very dramatic. This is primarily due to reduction in number of cells ruptured by ice crystals during freezing of the vacuum treated broccoli.

Pressure tests with the pressurometer show significant improvement in texture in vacuum treated broccoli. Control spears had a leathery surface layer of tissues and a somewhat soft center core whereas the vacuum treated spears were tender uniformly throughout the entire spear.

Color improvement of the vacuum treated broccoli was also very dramatic. Due to absence of oxygen in the tissues, there was no degradation of the chlorophyll during blanching and subsequent cooking after freezing.

This example illustrates that displacement by liquid, the gases and air in the tissues of broccoli by proper and complete evacuation significantly improves yield and color.

EXAMPLE VI — MARISCHINO CHERRIES

Marischino cherries are produced from pitted, sulfited fruit of several varieties. The sulfite reacts with the natural color present in the cherry flesh and bleaches the pigments. This is usually accomplished in barrels or covered vats in which the cherries are submerged in sulfurous acid of about 3,000 ppm. sulfur dioxide. To rid the cherries of sulfur dioxide, they are usually placed in wooden tanks and fresh water is introduced into the bottom of the tank and overflows the tank for a period of 24 to 36 hours. Essentially all solubles such as sugar, acid, starches, etc. are removed from the cherry. Water enters the holes in the cherry induced by the pitter to remove the seed before sulfiting.

Sulfur dioxide above 6–10 ppm. cannot be tolerated because of its characteristic flavor and because it reacts to bleach the dyes added to color the cherries in subsequent processing steps.

Experiments conducted at temperatures to 150°F. and varying levels of reduced pressure indicated that cherries containing 700 to 1,000 ppm. $SO_2$ cannot be sufficiently lowered in $SO_2$ content to be suitable for further processing. Levels of 35–40 ppm. $SO_2$ were achieved only after prolonged and thus uneconomical vacuum treatment (24 hour vacuum treatment). Considerable damage also occurred to the vacuum pump due to action of sulfurous acid on iron parts.

It was found that ordinary leaching in running water to 100 ppm. sulfur dioxide or less requires approximately 24 hours. Cherries leached to this $SO_2$ concentration were treated with food grade sodium peroxide at 5 percent in excess of the calculated amount to convert sulfur dioxide to the sulfate which was nonreactive, free of off-flavor and completely compatible with further processing steps.

In the earlier parent patent application filed Aug. 3, 1970, Ser. No. 60,765, a process was described that utilized a gradually increasing concentration of ingredients in a syrup which was recirculated by a pump outside of the vacuum chamber to a mixing and blending kettle where the additional ingredients were dissolved and were drawn by vacuum into the container in the vacuum chamber containing the cherries.

This procedure was satisfactory but very difficult to monitor and required constant attention. The following improvement provded to be entirely satisfactory. It was found that the addition of all of the ingredients at one time, at the beginning of the vacuum treatment, resulted in the lower portion of the cherries absorbing a much higher concentration of sugar than the upper portion, but by incorporation of a recirculation process including simple agitation during the vacuum treatment, equalization of sugar content with the cherries throughout the syrup was achieved.

VACUUM TREATMENT

Ten pounds of drained leached cherries were placed in a tub and covered with 17 pounds of syrup containing 62.5% sugar and 0.15 grams cherry shade coloring, 0.65 ml. almond (marischino flavor) and 75 grams of citric acid. A well in one corner of the tub was fabricated of perforated rigid plastic tubing in which a propeller on a shaft revolved at 400 rpm. Agitation was adequate to circulate the syrup around and through all of the cherries which were kept submerged in the syrup in the tub at all times. The shaft on which the propeller was mounted extended through an airtight packing gland to outside of the vacuum chamber where it was powered by an electric motor. This to assure maintenance of uniform temperature of 60°F. or less within the vacuum chamber.

The cherries were vacuum treated as in Example II except that the dwell pressure was maintained for 12 hours. The tub of cherries was removed from the vacuum chamber and allowed to stand for 4 hours at room temperature (75°F.) while agitation of the syrup continued. At the end of the 4 hours cherries were drained free of syrup and weighed, and Brix of the syrup was tested as follows:

Table No. 9

| | |
|---|---|
| Syrup | 53.8° Brix – 0.55% citric acid |
| Cherries | 53.0° Brix – 0.50% citric acid |

Analysis of the table above shows practically complete equilibrium between syrup and cherries.

Samples of the cherries treated above were held in one quart mason jars (covered with syrup) under refrigeration at 38°F. Four jars of cherries were drained free of syrup when they were packed as described above. Samples of marischino cherries available commercially were also placed in quart jars in identical manner as the cherries treated by this invention including weights, Brix and acid content. Jars of cherries from both lots that had been drained before storing were tested at intervals for drained weight and appearance. Results of the tests appear below. Exactly 1.5 pounds of fruit were placed initially in each jar.

a stainless steel bucket at 52°F. The shrimp were kept submerged by a weighted stainless steel wire screen. The bucket of shrimp was placed in a retort connected to a vacuum pump and the vacuum treatment of Example II applied except that in the dwell time the vacuum was applied for only 1 hour, after which the shrimp were removed from the bucket, drained and blanched for 1.5 minutes in an aqueous 2 percent sodium chloride solution. The shrimp were immediately placed into cans at 8 ounces per can, brined with a 1.5 percent sodium chloride solution containing 0.5 percent citric acid at 195°F. The cans were closed by an automatic closing machine and thermally processed in a retort for 45 minutes at 240°F. The cans were then cooled to a temperature of 110°F. in the retort by running water.

Following the present commercial procedure, 5 pounds of the shrimp identified as "control" and prepared identically as described above, were submerged in an aqueous solution of 0.5 percent citric acid and 2.5 percent sodium chloride at a temperature of 52°F for 45 minutes. The shrimp were then drained, blanched and placed into cans as described and processed in the identical manner as the "vacuum treated" shrimp.

Twenty-four hours after processing, 6 cans of each pack were examined for quality in accordance with Industry Standards. Headspace analysis was made in accordance with National Canners Association procedure.

Color, flavor, and general appearance of the shrimp were significantly improved by "vacuum treatment" to remove oxygen from the tissue prior to processing.

Other marine creatures in which color, flavor, aroma, and weight retention have been improved by vacuum treatment and various combinations of brines are crab meat, clams oysters, scallops and mussels. There is a Table No. 10

| Process | 12 Days Storage | | 21 Days Storage | | 60 Days Storage | |
|---|---|---|---|---|---|---|
| | Drained Weight | Appearance | Drained Weight | Appearance | Drained Weight | Appearance |
| Commercial | 1.19 lbs. | Shriveled | 1.09 lbs. | Shriveled | 1.00 lbs. | Very Shriveled |
| Present Invention | 1.41 lbs. | Smooth | 1.31 lbs. | Smooth | 1.25 lbs. | Slightly Shriveled |

The data above conclusively shows that when cells are essentially completely filled with syrup to equilibrium, the cherries retain their liquid in spite of long storage without protection of liquid surrounding the fruit. This indicates that fruit processed by this invention in cherry vanilla ice cream, for example, would not bleed and form islands of color around each cherry.

Appearance of the cherry produced by the present inventionced was only slightly affected by shriveling even after 60 days of storage. Appearance of the cherries produced by the present process and stored for 60 days was far superior to the commercially produced cherries after being held for only 12 days.

EXAMPLE VII — SHRIMP

Ten pounds of Pandalus Borealis shrimp were used in this Example. Five pounds of shrimp identified as "vacuum treated" were headed and peeled by hand and submerged in an aqueous solution composed of 0.5 percent citric acid and 2.5 percent sodium chloride in

| Results of Analysis | Vacuum Treated Samples | Control Samples |
|---|---|---|
| Drained wt., range | 6.8 to 7.1 oz. | 6.5 to 6.6 oz. |
| Drained wt., average | 6.95 oz. | 6.52 oz. |
| Color | Brilliant red | Slightly dull red |
| Curl | All units rightly curled | Some units slightly curled |
| Flavor | Typical | Weak, typical |
| Oxygen content headspace, range | 0.25 to 0.33% | 3.65 to 4.55% |
| Oxygen content headspace, average | 0.27% | 3.99% | particularly dramatic improvement in appearance and drained weight of clams insofar as color is concerned by the present process.

These examples are to be considered illustrative of the present invention and in no manner are limiting of the scope of the invention. For instance, instead of a two step increase or decrease in pressure, a single pressure rate of change may be used provided it is within

I claim:

1. The process of enhancing the appearance texture and storage characteristics of foods selected from the group consisting of fruits, vegetables, marine creatures and mushrooms by removing substantially all gases from the tissues and cells of said foods and substituting therefore an aqueous solution into the said tissues, the process comprising:

submersing said foods in said solution contained in enclosed vessel, subjecting said submersed foods to a reduction in pressure down to 200–300mm mercury at a rate of pressure decrease not greater than 125 mm of mercury per minute, further decreasing the pressure from 200–300mm mercury to a pressure not greater than 13mm of mercury (absolute) at a rate of pressure decrease not greater than 12mm mercury per minute, both said pressure decrease steps consuming at least a total of 28 minutes, continuing to subject said submersed foods to an absolute pressure of not greater than 13mm of mercury for a dwell time period of at least 1 hour to substantially remove all gases from said tissue and cells, increasing the pressure thereafter to fill with said solution the voids formed in said tissues and cells by the evacuation of the gases, said pressure increase being performed by increasing the pressure up to 55–65mm of mercury at a rate of pressure increase not greater than 12mm of mercury per minute, further increasing the pressure from 60mm of mercury up to atmospheric pressure at a rate of pressure increase not greater than 35mm of mercury per minute, both said pressure increase steps consuming at least a total of 28 minutes, whereby said foods are substantially filled with said solution and thereafter removing said foods from said vessel.

2. The process of claim 1 wherein said dwell time is at least 1¾ hours.

3. Process of claim 2 wherein said dwell time is at least 2 hours.

4. The process of claim 1 wherein said pressure during the dwell time is within the range of 2–13mm of mercury.

5. The process of claim 1 wherein the dwell pressure is within the range of 2–13mm of mercury and the dwell time is at least 1¾ hours in the fruit.

6. The process of claim 5 wherein the total time exceeds approximately 2 hours.

7. The process of claim 1 wherein the pressure decrease down to 200–300mm of mercury is at a pressure decrease rate of between 50 and 100mm of mercury per minute.

8. The process of claim 1 wherein not greater than 50 percent by volume (STP) of gases are removed within the first ten minutes.

9. The process of claim 1 wherein said foods include marine creatures selected from clams, shrimps, crab, scallops, mussels, oysters, lobsters; fruits selected from cherries, apples, pears, apricots, blueberries, strawberries, peaches and the like; vegetables selected from peas, corn, lima beans, string beans, cauliflower, onions, asparagus, brussel sprouts, carrots, potatoes, broccoli and the like;

10. The process of claim 1 wherein the pressure is first decreased at a maximum rate of 100mm per minute, then decreased to not greater than 13mm Hg at a rate not greater than 10mm Hg per minute.

11. The process of claim 1 wherein the pressure is raised to 60mm Hg at a maximum rate of 12mm Hg per minute and from 60mm to atmospheric at a maximum rate of 30mm Hg per minute.

12. The process of claim 1 wherein the total time for the pressure increase and the total time for the pressure decrease steps are each 30 minutes.

13. The process of claim 1 wherein the pressure is first decreased at a maximum rate of 100mm per minute, then decreased to not greater than 13mm Hg at a rate not greater than 10mm Hg per minute, and wherein the pressure is raised to 60mm Hg at a maximum rate of 12mm Hg per minute and from 60mm Hg to atmospheric at a maximum rate of 30mm Hg per minute, and wherein the total time for the pressure increase and the total time for the pressure decrease steps are each 30 minutes.

14. The process of claim 13 wherein the total time for the process is at least 2 hours.

15. The process of claim 1 wherein said foods are cranberries.

16. The process of claim 1 wherein said foods are mushroom.

17. Foods selected from the group consisting of fruits, vegetables, marine creatures and mushrooms comprising cells and tissues substantially free of internal gases and impregnated with an aqueous solution, said cells being distended and strengthened whereby said cells and said fruits are capable of maintaining cell integrity during varied temperature processing, said foods being produced by the process of:

submersing said foods in said solution contained in enclosed vessel, subjecting said submersed foods to a reduction in pressure down to 200–300mm mercury at a rate of pressure decrease not greater than 125mm of mercury per minute, further decreasing the pressure from 200–300mm mercury to a pressure not greater than 13mm of mercury (absolute) at a rate of pressure decrease not greater than 12mm mercury per minute, both said pressure decrease steps consuming at least a total of 28 minutes, continuing to subject said submersed foods to an absolute pressure of not greater than 13mm of mercury for a dwell time period of at least 1 hour to substantially remove all gases from said tissue and cells, increasing the pressure thereafter to fill with said solution the voids formed in said tissues and cells by the evacuation of the gases, said pressure increase being performed by increasing the pressure up to 55–65mm of mercury at a rate of pressure increase not greater than 12mm of mercury per minute, further increasing the pressure from 60mm of mercury up to atmospheric pressure at a rate of pressure increase not greater than 35mm of mercury per minute, both said pressure increase steps consuming at least a total of 28 minutes, whereby said foods are substantially filled with said solution and thereafter removing said foods from said vessel.

18. The foods of claim 17 being cranberries.

19. The foods of claim 17 being mushrooms.

* * * * *